(12) United States Patent
Cassidy et al.

(10) Patent No.: US 6,480,725 B2
(45) Date of Patent: *Nov. 12, 2002

(54) TELEPHONE

(75) Inventors: Brian Cassidy, Berkshire (GB); Ian Ray, Berkshire (GB); Jonathan Marsters, Berkshire (GB); Peter Scudamore, Berkshire (GB); Anthony Butler, Surrey (GB); Paul Edwards, Surrey (GB)

(73) Assignee: Nokia Mobile Phones, Ltd., Espoo (FI)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/088,136

(22) Filed: Jun. 1, 1998

(65) Prior Publication Data

US 2002/0142813 A1 Oct. 3, 2002

(51) Int. Cl.[7] .................................................. H04Q 7/20
(52) U.S. Cl. ........................ 455/558; 455/551; 455/553
(58) Field of Search ................................ 455/575, 558, 455/550, 90, 551, 552, 553, 557, 556, 344, 407, 411; 235/380, 382; 379/357

(56) References Cited

U.S. PATENT DOCUMENTS

| | | | | |
|---|---|---|---|---|
| 5,266,782 A | * | 11/1993 | Alanara et al. | 235/380 |
| 5,857,157 A | * | 1/1999 | Shindo | 455/550 |
| 5,867,795 A | * | 2/1999 | Novis et al. | 455/550 |
| 5,875,404 A | * | 2/1999 | Messiet | 455/558 |
| 5,884,168 A | * | 3/1999 | Kolev | 455/432 |
| 5,915,226 A | * | 6/1999 | Martineau | 455/558 |
| 5,999,811 A | * | 12/1999 | Molne | 455/432 |
| 6,014,561 A | * | 1/2000 | Molne | 455/419 |
| 6,097,950 A | * | 8/2000 | Bertacchi | 355/432 |
| 6,185,436 B1 | * | 2/2001 | Vu | 455/558 |

* cited by examiner

*Primary Examiner*—Thanh Cong Le
*Assistant Examiner*—Nick Corsaro
(74) *Attorney, Agent, or Firm*—Perman & Green, LLP

(57) ABSTRACT

A telephone is disclosed which comprises a memory (6) for storing first information, such as ID information, and a memory module receiver (10) for removably receiving a memory module for storing second information, such as ID information. The telephone also comprises a microprocessor (4) for detecting a change in contact between the memory module and the memory module receiver (10) since the previous use of the telephone. The microprocessor (4) uses the first information when the memory module and receiving means are not in contact and the second information when memory module and receiving means are in contact whilst there is no change detected. However, when a change is detected, the information to be used by the microprocessor (4) is selected, either automatically or manually.

30 Claims, 7 Drawing Sheets

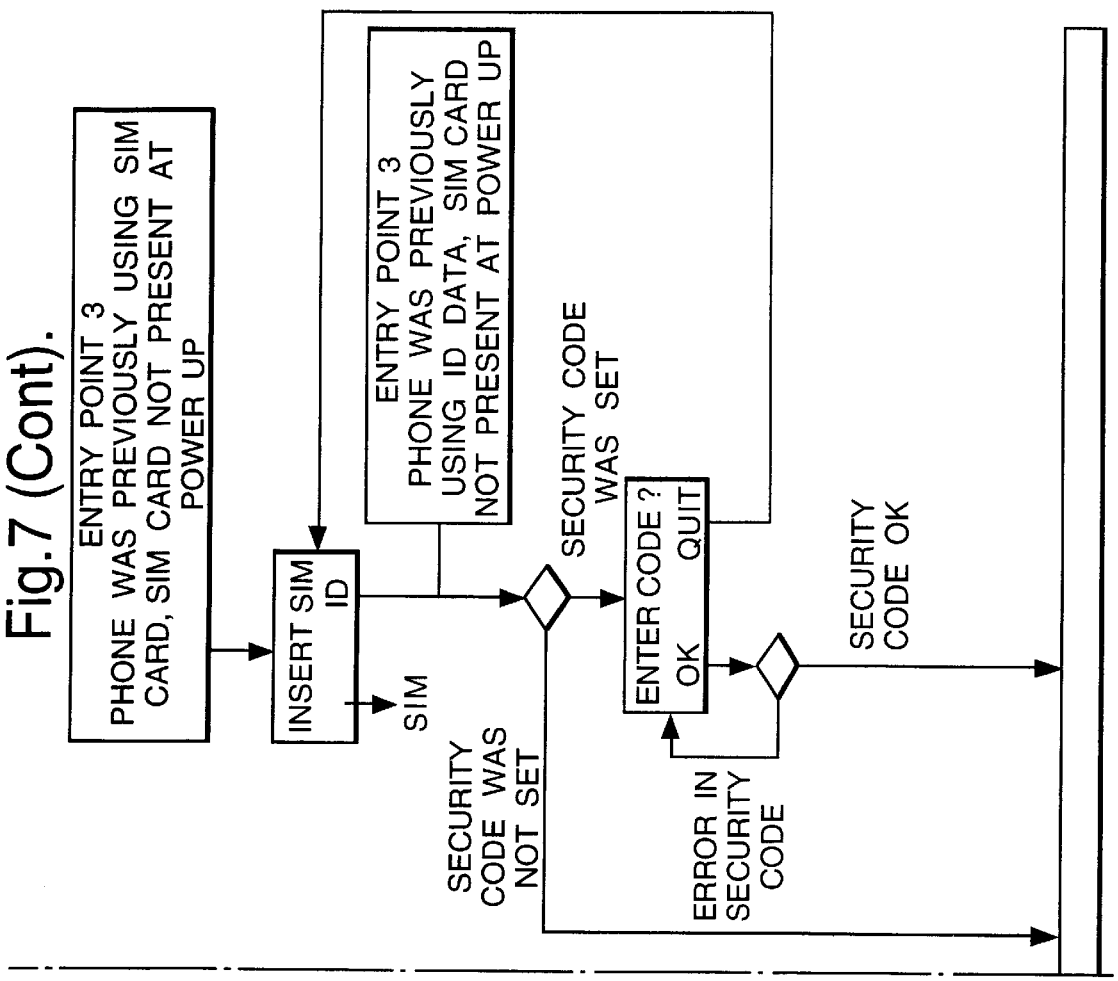

TELEPHONE

CROSS REFERENCE TO RELATED APPLICATIONS

U.S. patent application Ser. No. 08/099,709, for a Radio Arrangement, filed Jul. 29, 1993, to Ali-Vehmas et al., and U.S. patent application Ser. No. 09/235,094, for a Radio Arrangement, filed Jan. 21, 1999, to Ali-Vehmas et al.

BACKGROUND OF THE INVENTION

This invention relates to a telephone and, more particularly, to a telephone including means for storing first information and means for removably receiving a memory module for storing second information.

It is known in the field of cellular radio telephones, for example, to have a handset with an internal memory, such as a read only memory (ROM) or electrically erasable programmable ROM (EEPROM) for storing information. Typically such a memory stores number assignment module (NAM) data (e.g. telephone number, system ID, electronic serial number), and often also stores user customised information (e.g. abbreviated dialling information).

It is also known in the field of cellular radio telephones, for example, to use a memory module to store identity information. A memory module such as a data card is not part of the handset. Instead, it may be removably inserted into the telephone. Data, such as identity information, is read from the inserted card and used in the subsequent operation of the telephone. By way of example European Patent Application EP-A-0,369,110 discloses a mobile radio telephone having a handset into which a data card storing subscriber-related information is insertable for transferring information from the data card to the working memory of the telephone.

The data card may be, for example, a "smart card" which is similar in size to a conventional plastic credit card and which includes a memory implemented as an integrated circuit device, commonly referred to as a "chip", in which information is stored. For this reason such cards are also often known as "chip cards".

The smart card may comprise a subscriber identity module (SIM). Also, In addition to subscriber identity information, such as the subscriber telephone number, and personal identification number (PIN), the smart card may store for example, call charge information (i.e. a charge meter), a telephone number index, or false PIN entries.

SIM cards are currently available in two sizes. The functionality of the SIM is the same for each, it is essentially that the physical dimensions are different. One is a credit card size SIM, the other is a plug-in SIM about 20 mm×25 mm. The rationale behind the different sizes is that the credit card size is perceived as a convenient size for the user from a practical standpoint. However, the credit card size is relatively large, and smaller card sizes are needed as miniaturization continues to drive down the overall size of the terminal (i.e. the radio telephone unit itself). The plug-in SIM is intended to be semi-permanently installed in the cellular telephone.

SUMMARY OF THE INVENTION

According to the present invention there is provided a telephone comprising means for storing first information, means for removably receiving a memory module for storing second information, means for detecting a change in contact between the memory module and receiving means since the previous use of the telephone, information processing means adapted, while no change is detected, to use the first information when the memory module and receiving means are not in contact and the second information when the memory module and receiving means are in contact, and means for selecting which information is to be used by the information processing means when a change in contact is detected.

As used in the present context, the term "memory module" includes a data card (such as a smart card (IC card) or a magnetic card), and other forms of package enclosing or carrying a memory device. The data card may be a passive memory card, i.e. essentially a read only memory (ROM), or an active processor card, i.e. capable of processing information internally within the card.

A telephone in accordance with the invention is advantageous to manufacturers, network operators and users, for the reasons exemplified below. Networks currently either identify a telephone by its internal ID or identify a subscriber by the identity on his SIM card (hereinafter called ID networks and SIM networks respectively). Since the telephone of the present invention has a dual identity, by comprising both means for storing its own identification (ID) information and means for removably receiving a memory module for storing, for example, subscriber identification information, the manufacturer only needs to manufacture one type of phone which can be used on both the ID and the SIM networks. Hence, manufacturing costs can be reduced. Network operators can provide an extra service to their subscribers by introducing the other identification method to provide a dual ID/SIM network. Also, operators currently providing ID networks but wishing to test the viability of a SIM network could introduce SIM cards on a trial basis, knowing that they could revert back to ID network if SIM cards proved unpopular with their customers. Moreover, the user of a phone according to the present invention has improved flexibility. Firstly, he can use the phone on the current sole ID networks and SIM networks, as well as any introduced dual ID/SIM networks. Hence, he has a greater choice of networks without having to purchase a new phone. Secondly, the user can have separate accounts and data, one on the telephone ID and one on the memory module. For example, one account could be business related and the other personal. Thirdly, the telephone operation is simple for the user. The existence of the dual identity is not apparent to the user whilst he only uses one of the identities. It is only when the contact between the memory module and the receiving means changes (e.g. by insertion or removal of the memory module) that the user might become aware of the existence of the other identity.

Furthermore, the telephone of the present invention comprises means for selecting which information is to be used by the information processing means when a change in contact is detected. For example, if two identities are present simultaneously it will determine which one will be used in preference to the other. Hence, the two information stores may contain different, possibly conflicting, items of data, but of the same data type, and the telephone in accordance with the invention will have the capacity to select one of the data items in preference to the other, so avoiding the conflict. For example, the first information may comprise a first identity number (e.g. a subscriber number), and the second information may comprise a second identity number. When the memory module is inserted to be in contact with the receiving means the telephone in accordance with the invention will be operable with only one of the identity numbers, since the information processing means will use the information selected by the selecting means.

The selecting means may comprise means for manually selecting which information is to be used by the information processing means when a change in contact is detected. The manual selecting means may be arranged to select which information is to be used by the information processing means in response to the detection of a change in contact. For example, the user could be notified of a change resulting in the memory module contacting the receiving means and be given the option of selecting the second information stored in the memory module or the first information stored in the storing means. Alternatively, the manual selecting means may be arranged to select which information is to be used by the information processing means should a change in contact be detected. For example, the manual selecting means may prioritise which information is used depending on the change, whenever a change occurs. This could be done by menu selection.

In one embodiment of the invention, in the absence of a manual selection, the selecting means defaults to selecting the first information when the memory module and receiving means are not in contact and the second information when the memory module and receiving means are in contact.

The telephone preferably comprises means for indicating a change in contact between the memory module and receiving means to the user. This enables the user to be advised of any accidental disconnection of a SIM card, for example, due to the telephone being knocked or dropped. He can then take the appropriate action, such as selecting the requisite information to be used, so that incoming calls are not missed, outgoing calls are charged to the correct account and requisite abbreviated dialling numbers are available.

Optionally, the telephone is power cycled, (turned off and on) when a change in contact is detected. This ensures that the phone is reset should an error in connection of the SIM card occur whilst the phone is in standby mode. The telephone may be automatically power cycled when a change in contact is detected. Alternatively, it may lead the user to manually power cycle the telephone when a change in contact is detected. For example, when a change in contact is detected the user might only be able to activate the power key to alter the state of the telephone.

To reduce power consumption, the detecting means may operate only when the telephone is powered up. Alternatively, it may operate periodically.

BRIEF DESCRIPTION OF THE DRAWINGS

Embodiments of the present invention will now be described, by way of example, with reference to the accompanying drawings, of which:

FIG. 2b is a flow chart showing the information given to the user during the operation shown in FIG. 2a;

FIG. 3b is a flow chart showing the information given to the user during the operation shown in FIG. 3a;

DETAILED DESCRIPTION OF THE INVENTION

Figure 1:
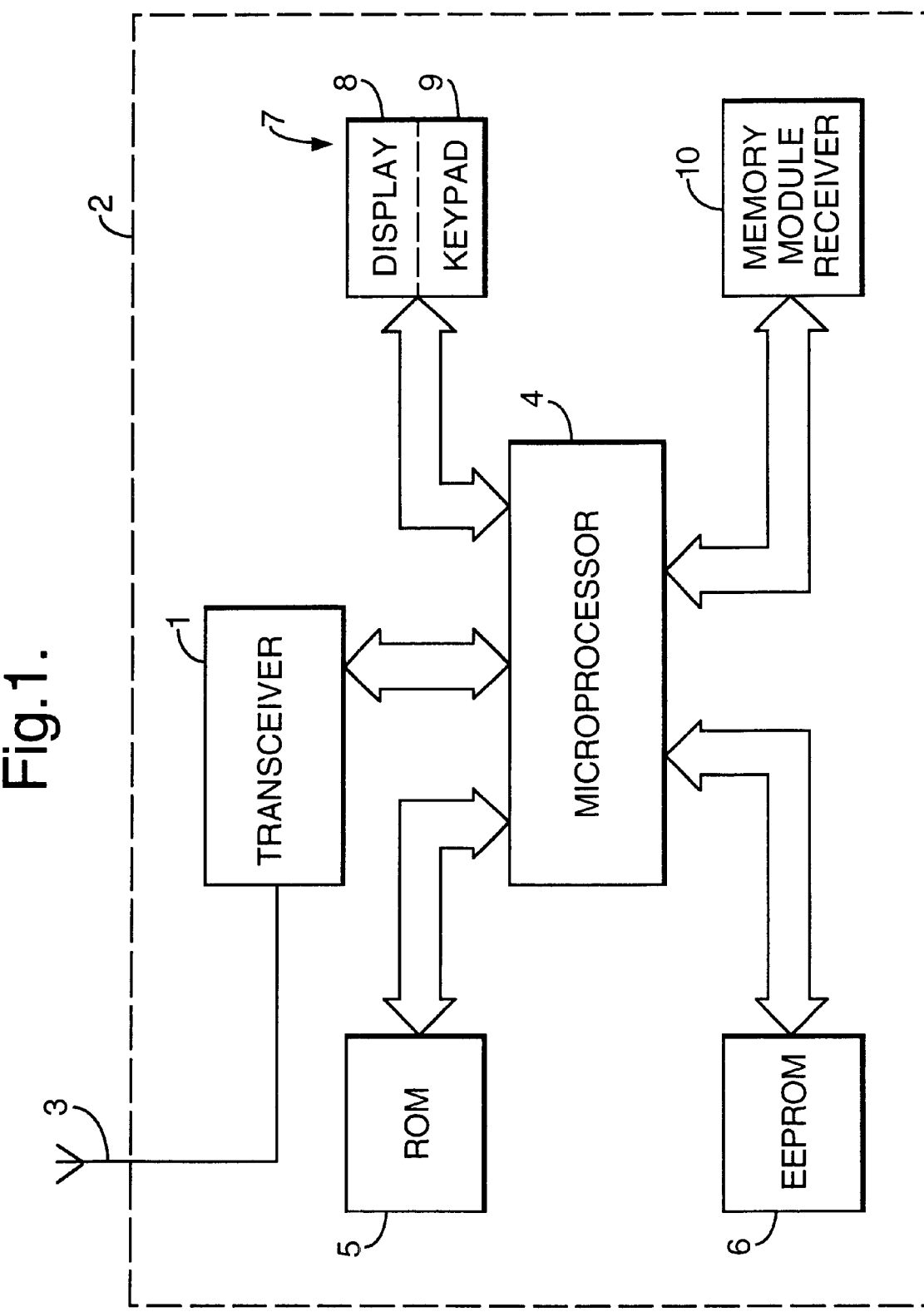
FIG. 1 is a functional block diagram of a telephone in accordance with the present invention.

The telephone shown in FIG. 1 is a cellular mobile telephone according to an embodiment of the present invention comprising a transceiver 1 and all the other features conventionally found in a cellular telephone. The transceiver is present within a handset housing 2 and is coupled to an external antenna 3. As is conventional, a microprocessor 4, enclosed within the transceiver housing 2, is employed to control all the basic functions of the telephone. Also enclosed within the housing 2 is a read only memory (ROM) 5 in which is stored the operating software for the telephone and which is coupled to the microprocessor 4. An EEPROM 6 is also coupled to the microprocessor, and is used for storing both NAM data (e.g. telephone number, system ID, electronic serial number) and abbreviated dialling information (i.e. a telephone number store). The handset also comprises a user interface 7 including a visual display 8 and a keypad 9, which is also coupled to the microprocessor 4. The display, for example, may be a liquid crystal display, and the keypad 9 may comprise function keys, soft keys, and alphanumeric keys. The handset also comprises a memory module receiver 10. This receiver can receive a memory module, such as a SIM card which, for example, may store subscriber related data (e.g. subscriber number, system ID, system channel scan data and serial number). This memory module receiver 10 is designed so that such a memory module can be plugged in or removed in a relatively straight forward manner. The receiver may form a recess or compartment in the handset housing 2. As well as containing subscriber related data, the SIM card may also contain other subscriber related information or applications, for example, repetary dialling information, charge meter information, function control information, an authentication algorithm etc. It is noted here that a SIM card is not a passive memory card, but also a processor card which includes not only a memory, but a facility for internally processing information, as is well known in the art. The data stored in the SIM is used by the microprocessor 7 to enable the telephone to communicate on the appropriate network. Other data stored on the SIM card is used by the microprocessor for, for example, to control, modify, or monitor the operation of the telephone in a conventional manner.

In use, the microprocessor 4 periodically monitors whether a change in contact between the memory module receiver 10 and the SIM card has occurred (that is, whether the SIM card has been inserted or removed). If there is no change, the telephone continues using the information stored in the previously used store, that is the EEPROM 6 if no SIM card is present or the SIM card in the memory module receiver 10 if the memory module is present. This is further explained with reference to FIGS. 2 and 3 of the accompanying drawings below. Alternatively, if a change is detected by the microprocessor 4, then it uses the information selected to be used. This is further explained with reference to FIGS. 4 to 6 below. Selection may be predetermined either automatically or by the user, or may be made by the user following detection of a change. In this embodiment, if the insertion of the SIM card is detected during a call, the call will continue using the ID information in the EEPROM 6. However, if the SIM card is removed, then the call will terminate.

FIGS. 2a, 2b, 3a and 3b show the operation of the telephone according to an embodiment of the present invention, when no change in the presence or absence of a memory module and memory module receiver 10 is detected.

Figure 2A:
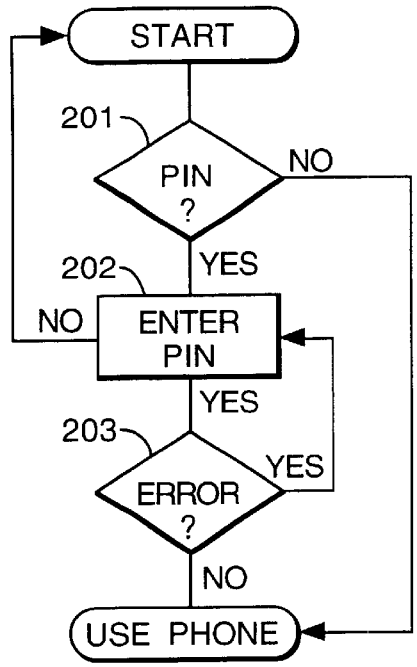
FIG. 2a is a flow chart showing operation of a telephone in accordance with an embodiment of the present invention when a SIM card is maintained in a SIM card receiver of the telephone.

FIG. 2a shows the operation of the telephone according to an embodiment of the present invention when a SIM card is present. No change in the presence of the SIM card is detected by microprocessor 4, and consequently the phone operation is the same as that of a conventional SIM card. That is, the microprocessor checks whether a PIN number is required (step 201). If no PIN number is necessary, the phone is ready to use. Alternatively, if a PIN number is required, the microprocessor 4 checks whether a PIN number has been entered. Once a PIN number has been entered, it is checked to see if it is correct (i.e. it is checked to see if it corresponds to the PIN number associated with the SIM card) (step 203). Assuming the PIN number is correct, the phone is then ready to use.

Figure 2B:
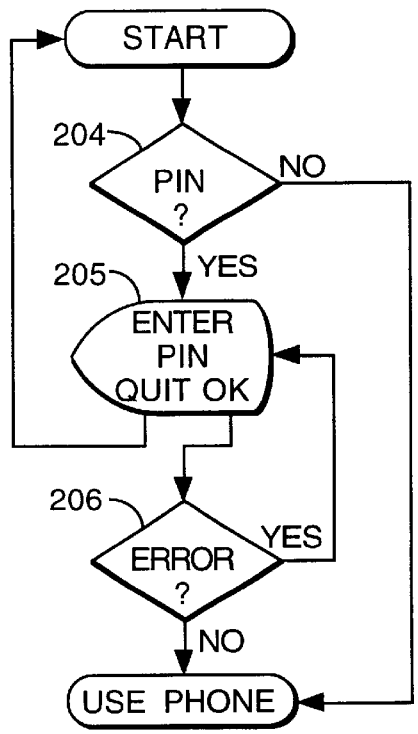

FIG. 2b shows the information given to the user via the display 8 during the operation of the phone as shown in FIG. 2a. Steps 204 to 206 correspond to steps 201 to 203 in FIG. 2a. In particular, step 205 shows an example of text displayed on the display 8 of the telephone. The user is given the option of entering the PIN number or quitting the application. Once the user has entered a PIN number on the keypad 9, the PIN number is checked by the microprocessor 4 (step 206) as described above.

Figure 3A:
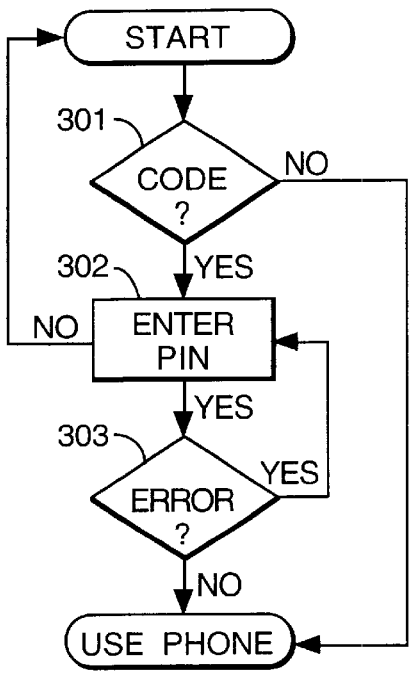
FIG. 3a is a flow chart showing operation of a telephone in accordance with an embodiment of the present invention whilst a SIM card is not present in a SIM card receiver of the telephone.

FIG. 3a shows the operation of a telephone according to an embodiment of the present invention when there is no SIM card present. That is, where the telephone used the ID data on the EEPROM 6 last time it was used and no SIM card has been inserted since. In this situation, the phone operation is that of a conventional phone solely having an internal information store (EEPROM 6). In this instance, the microprocessor 4 checks whether a security code is required (step 301). If no security code is required, the phone is ready to use. Alternatively, if a security code is required to be entered, the microprocessor 4 checks whether it has indeed been entered. Once the microprocessor is aware that the security code has been entered, that code is checked to see if it is correct (i.e. that it corresponds to the security code associated with the telephone) (step 203). Assuming the code is correct, the phone is then ready to use.

Figure 3B:
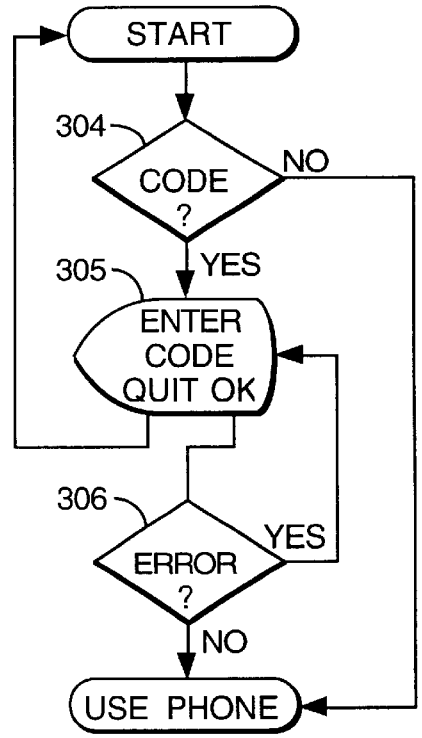

FIG. 3b shows the information given to the user during the operation of the telephone shown in FIG. 3a. Steps 304 to 306 correspond to steps 301 to 303 in FIG. 3a. In particular, step 305 shows an example of text displayed on the display 8 of the telephone. The user is given the option of entering the security code or quitting the application. Once the user has entered the security code using the keypad 9, the code is checked by the microprocessor 4 (step 306) as described above.

As is exemplified in FIGS. 2 and 3 of the present application, the existence of the provision of a telephone which can deal with dual information stores is not apparent to the user whilst he only uses information from one of them.

If he continually uses the SIM card, then the telephone is seen as a conventional SIM card type telephone by the user. Alternatively, if only the internal ID of the phone is used, then the user sees the telephone as a conventional internal ID type telephone. It is only when the contact between the SIM card and the receiving means changes (for example by insertion or removal of the SIM card) that the user might become aware of the existence of the other information.

Figure 4:
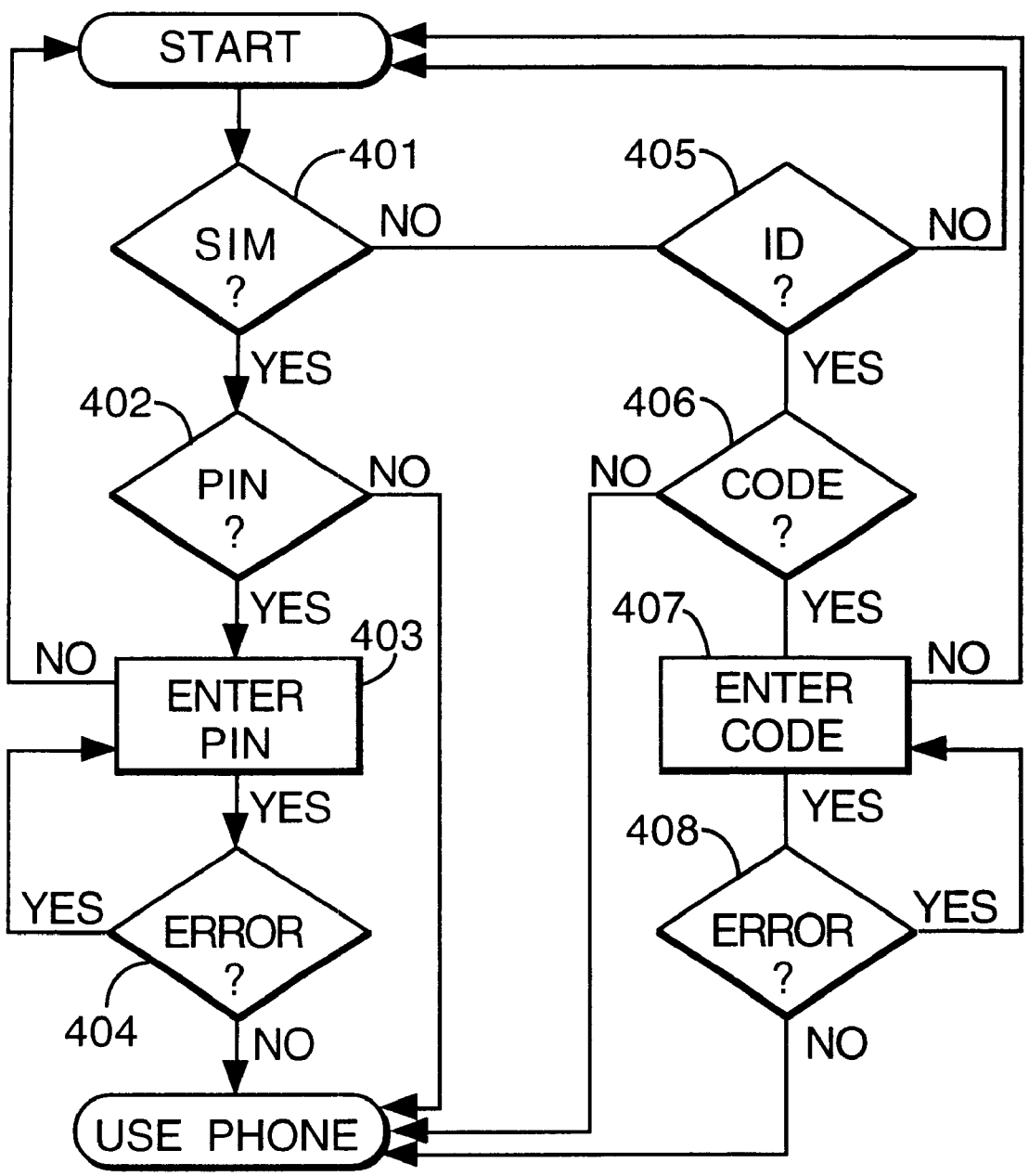
FIG. 4 is a flow chart showing operation of a telephone in accordance with an embodiment of the present invention when a SIM card is inserted into or removed from a SIM card receiver of the telephone since the previous use of the telephone.

The operation of a telephone according to an embodiment of the present invention when a memory module is inserted into or removed from the memory module receiver 10 is shown in FIG. 4.

If the microprocessor 4 detects a change in the presence or absence of a memory module in the memory module receiver 10, it checks whether the information stored in the phone's EEPROM 6 or the information stored on the memory module is to be selected for use. In the embodiment shown, the microprocessor 4 first checks whether the information stored on SIM card is to be used (step 401). If so, and the SIM card is present, the PIN checking procedure described above in respect of FIG. 2a is performed (steps 402 to 404). If the SIM card is not to be used, it is checked whether the information on EEPROM 6 is to be used (step 405). If it is, then the security code checking procedure described above in respect of FIG. 3a is performed (steps 406 to 408).

The selection procedure may be automatic. For example, the microprocessor 4 could have a default in which information stored in the EEPROM 6 is selected in the absence of a SIM card and information stored in the SIM card is selected whenever the card contacts the receiver 10. However, it is preferable if the user can manually select which information is to be used in certain scenarios. This can be achieved by menu selection with the aid of the user interface 7 on the handset. More specifically, by depressing the keys on the keypad 9, the user may enter a menu mode in which the option becomes available to select which information is to be used should a SIM card be removed or inserted. To this end, one of the keys on the keypad 9 may include a menu or function key, suitably labelled, as is usual in such telephones. Depression of this key permits a variety of preset menus, the related instructions of which may be stored in the read only memory 5, to be viewed on the display 8 and selectively enabled. The various menus may be selected by pressing appropriate keys on the keypad after pressing the menu key. The relevant menu is shown to the user in words or abbreviations on the display.

In one embodiment of the present invention, a special menu is provided to permit manual selection of the information to be used in certain scenarios. For example, the options may be shown on the display and the user may choose the required option by pressing the appropriate key or keys on the keypad or scrolling through the options and highlighting the required one. The options may include the following:

(i) Internal ID only
(ii) SIM only
(iii) Default
(iv) Manual.

In option (iv) a message will be displayed indicating to the user that a change in presence or absence of the SIM has occurred, whenever such a change does indeed occur. The provision of such an indication to the user avoids the potential problem of incoming calls being missed and outgoing calls being charged to the wrong subscriber (for example if the internal ID is a user's own subscription and the SIM is a corporate account), should the SIM card erroneously lose contact with its receiver 10 and the phone consequently automatically switches to selecting internal ID information. Moreover, it enables the user to lend his phone to someone who possesses a SIM card, knowing that any erroneous dislodgment of the SIM card would not automatically result in the internal ID of his phone being selected, and thus the user himself being charged. Instead, the user can select which information is to be used in each instance that there is a change in contact between the SIM card and receiver 10. Other options could exist in which a manual selection overrides the aforementioned default selection.

Figure 5:
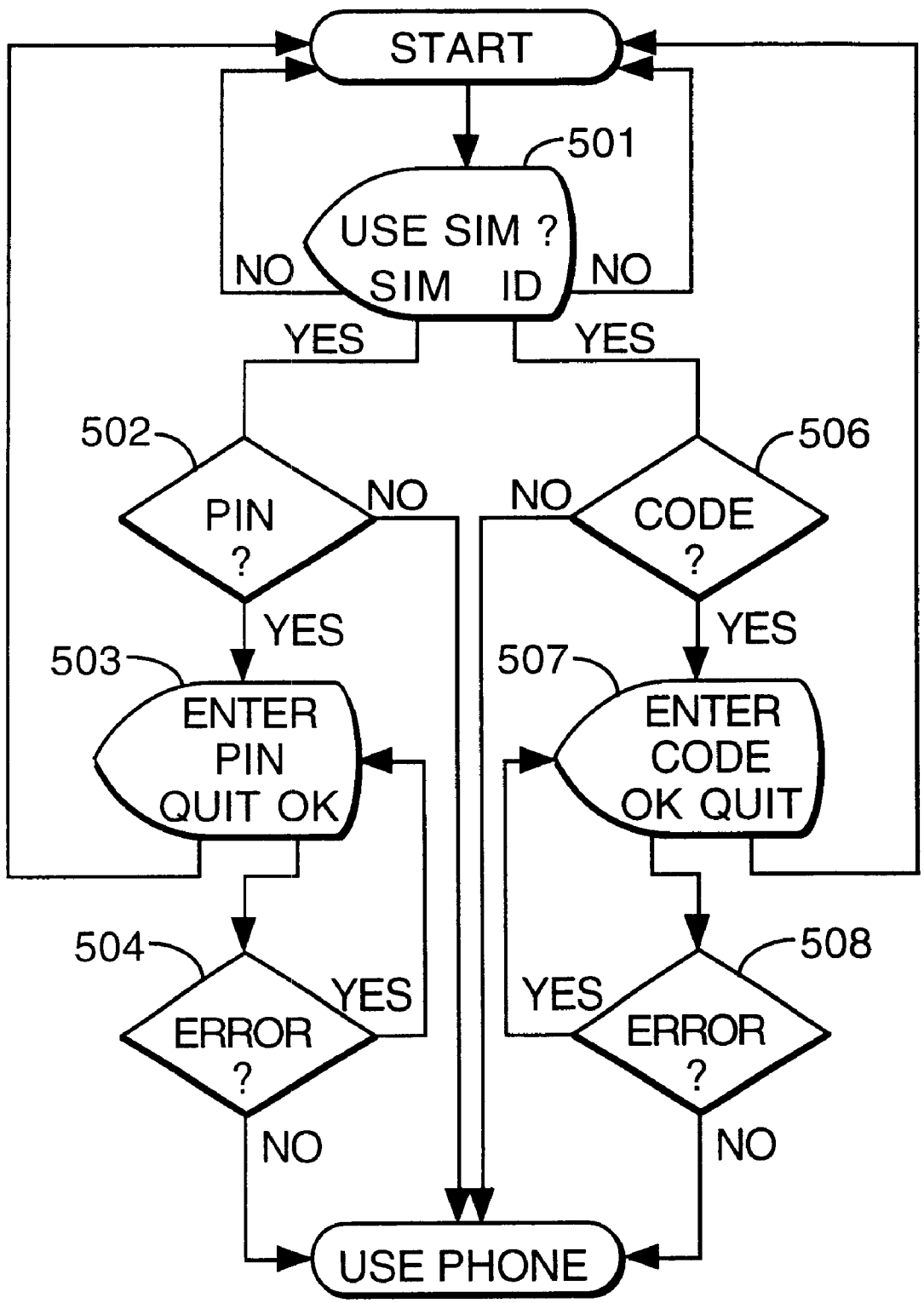
FIG. 5 is a flow chart showing the information given to the user during the operation shown in FIG. 4, when the SIM card is inserted into the SIM card receiver.
Figure 6:
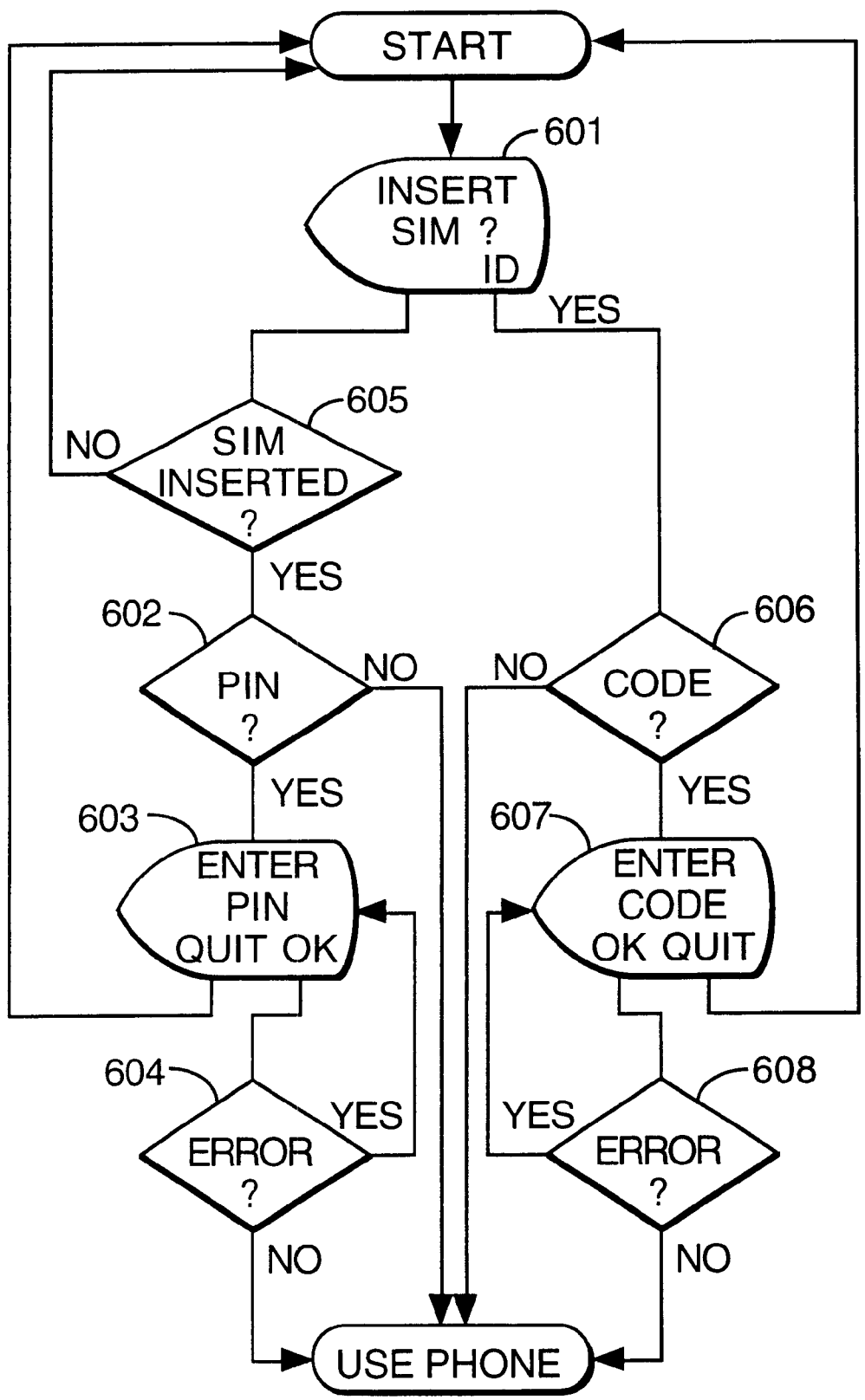
FIG. 6 is a flow chart showing the information given to the user during the operation shown in FIG. 4, when the SIM card is removed from the SIM card receiver.

FIG. 5 shows the information given to the user during the operation shown in FIG. 4 when the SIM card is inserted into the SIM card receiver, and FIG. 6 shows the information given to the user during the operation shown in FIG. 4, when the SIM card is removed from the SIM card receiver.

FIG. 5 shows the information provided to the user on the display 9 when there is a change detected and a SIM card is present. In this case, the case where manual selection is provided. The user is asked whether he wishes to use the SIM card information or information on the EEPROM 6, as shown in the display (step 501). If he selects the SIM card then the PIN checking procedure described above in respect of FIG. 2a is performed (steps 502 to 504). Alternatively, if the ID information on the EEPROM 6 is to be used, then the security code checking procedure described above in respect of FIG. 3a is performed (steps 506 to 508).

FIG. 6 shows the information provided to the user on the display 9 when there is a change detected and no SIM card is present. Again, in this case, manual selection is provided. The user is prompted to insert the SIM card (step 601). Alternatively, he is given the option of selecting to use the information stored in the EEPROM 6. In the event that the user selects to use the internal ID, then the security code checking procedure described above in respect of FIG. 3a is performed (steps 606 to 608). However, if the internal ID information is not selected then the microprocessor 4 checks whether a SIM card has been inserted (step 605). If no SIM card is inserted the display continues to bear the insert SIM message (step 601). However, if a SIM card is inserted, the PIN checking procedure described above in respect of FIG. 2a is performed (steps 602 to 604).

In a preferred embodiment, whenever a change in contact between the memory module and the memory module receiver 10 is detected, the phone is power cycled (i.e. turned off and on). This ensures that the phone is completely reset to operate efficiently using the other form of information. Power cycling can be automatic. For example, if a SIM card falls out of the receiver when the phone is dropped, the phone could be powered off and on in response to the reinsertion of the SIM card to ensure that the SIM information is quickly and efficiently used. Alternatively, the telephone may lead the user to manually power cycle the telephone when a change in contact is detected. For example, in the embodiment shown in FIG. 6, after the SIM is inserted (after step 605) only the power key on the keypad 9 is capable of being operated, thus forcing the user to manually power cycle the telephone after inserting the SIM. Likewise, if the user selects the ID information in step 601, then subsequently only the power key can be activated, in order to force the user to power cycle the telephone. In each case, once the telephone has been power cycled, the next steps may be performed.

Additionally, it is preferable if the SIM card receiver 10 is only accessible by removing the handset battery. In this way, the telephone will be powered down and up whenever the SIM card is inserted or removed from the receiver by the user, thus ensuring efficient selection between the two information stores.

Figure 7:
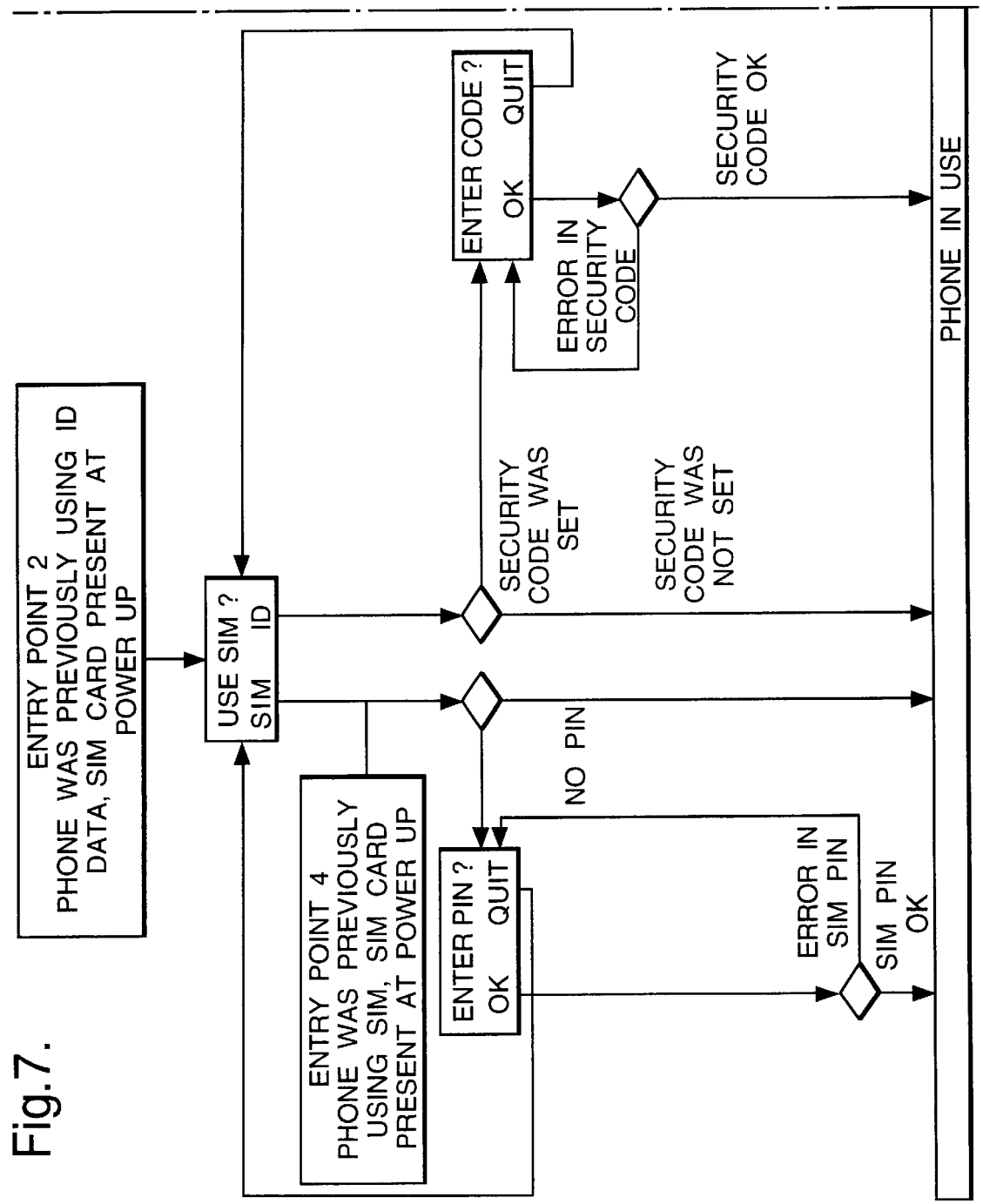
FIG. 7 is a flow chart showing all scenarios possible in a telephone according to a preferred embodiment of the present invention.

FIG. 7 shows all the scenarios possible in a telephone according to a preferred embodiment of the present invention.

In this embodiment, a change in the source of ID information only occurs at power on. If the phone is powered on and using internal ID information, this information can only change as part of an ID erase process. This by necessity involves power cycling the phone. If the phone is using a SIM and the physical connection between SIM and phone is lost (due to being subject to a physical jolt), then the phone requires power cycling before a SIM can be recognised again.

At power on, there are four possible scenarios, which are shown in FIG. 7 and described below:

1) phone was previously using internal ID information, and no SIM card is detected at power on. In this case, the phone will either attempt to enter service immediately or prompt for a security code, if the user has protected his phone, to stop others using it. This is identical behaviour to phones that only have internal ID information, and so a user who never uses a SIM in his phone will notice no difference to existing behaviour.

2) phone was previously using ID information, and the presence of a SIM is detected at power on. In this case, the user will be prompted whether to use internal ID information or that contained in the SIM. If the former is chosen, then the same procedures described in point 1) above are followed. In the latter case, if the SIM is PIN code protected, the user must enter this in order to enter service. If no PIN code is set, the phone will attempt to enter service immediately.

3) phone was previously using SIM information, but no SIM is detected at power on. In this case, the user will be prompted to insert a SIM card, but also given the option of using the internal ID information. In the former case, the phone must be power cycled in order to insert the SIM, and if a SIM is inserted, the actions associated with point 4) will be followed on subsequent power on. In the latter case, the same procedures described in point 1) above are followed.

4) phone was previously using SIM information and a SIM is detected at power on. In this case, the phone will immediately either prompt for the PIN code or enter service immediately, depending what level of protection has been applied to the SIM. If the user wishes to use ID information, he can decide not to enter his PIN, at which point he will be given the option of whether to use ID information or SIM.

It will be noted from the above points that for those users who only ever use internal ID information or a SIM card (but not both), that the operation and selection procedures are kept as simple as possible. It is only those users who swap between subscriptions who have to make a choice as to what system they want to use.

As discussed above, the invention allows the same phone to be used, whether they are to be eventually used with on a SIM or ID network. This ensures minimal problems in logistics for manufacturers, network operators and end users, as the phones of the present invention are dual purpose and dynamically configurable.

In view of the foregoing description it would be evident to a person skilled in the art that various modifications may be made within the scope of the claims.

What is claimed is:

1. A telephone comprising:
a fixed memory for storing phone identity information for calls under a first subscription;
a memory module receiving device for removably receiving a memory module for storing subscriber identity information for calls under a second subscription, whereas the phone identity information is stored in the fixed memory independent of the information in the memory module;
a selector for selecting between the information from the fixed memory and the memory module;
and an information processor adapted to use the information selected by the selector for operation of the telephone under one or the other of the subscriptions.

2. A telephone as claimed in claim 1, wherein the selector comprises a manual selector for selecting which information is to be used by the information processor when a change in contact associated with the memory module receiving device is detected.

3. A telephone as claimed in claim 2, wherein the manual selector is arranged to allow a user to select which information is to be used by the information processor in response to the detection of a change in contact.

4. A telephone as claimed in claim 2, wherein the manual selector is arranged to automatically select which information is to be used by the information processing means should a change in contact be detected.

5. A telephone as claimed in claim 2, wherein, in the absence of a manual selection, the selector selects phone identity information when the memory module and receiving device are not in contact or subscriber identity information when the memory module and receiving device are in contact.

6. A telephone as claimed in claim 2, further comprising an indicator for indicating a change in contact between the memory module and receiving device to the user.

7. A telephone as claimed in claim 1, which is power cycled when a change in contact associated with the memory module receiving device is detected.

8. A telephone as claimed in claim 7, which is automatically power cycled when a change in contact is detected.

9. A telephone as claimed in claim 7, wherein a user may manually power cycle the telephone when a change in contact is detected.

10. A telephone as claimed in claim 6, wherein the detector operates when the telephone is powered up.

11. A telephone as claimed in claim 1, further comprising a memory module detector for detecting the presence of a memory module in the memory receiving device, wherein the selector selects non user transferable subscriber identity information when the detector does not detect a memory module and user transferable subscriber identity information when the detector detects a memory module.

12. A telephone as in claim 1 wherein the memory module is a SIM.

13. A telephone comprising:
a fixed memory for storing number assignment module (NAM) data for calls under a first subscription;
a memory module receiving device for removably receiving a memory module for storing subscriber identity information for calls under a second subscription, whereas the information is stored in the fixed memory independently of the information in the memory module;
a selector for selecting between the information from the fixed memory and the memory module;
and an information processor adapted to use the information selected by the selector for operation of the telephone under one or the other of the subscriptions.

14. A telephone as claimed in claim 13 wherein said NAM data comprises phone identity information.

15. A telephone as claimed in claim 14 wherein the phone identity information is the electronic serial number (ESN) and where the NAM data also comprises the telephone number.

16. A telephone comprising:
a fixed memory for storing first subscriber identity information for calls under a first subscription;
a memory module receiving device for removably receiving a subscriber identity module (SIM) for storing second subscriber identity information for calls under a second subscription, whereas the first subscriber identity is stored in the fixed memory module independently of the SIM;
a selector for selecting between the information from the fixed memory and the SIM;
and an information processor adapted to use the information selected by the selector for operation of the telephone under one or the other of the subscriptions.

17. A telephone as claimed in claim 16 wherein the first subscriber identity information is the phone ID and the second subscriber identity information is the subscriber ID.

18. A dual mode telephone comprising:
a fixed memory for storing first subscriber identity information for calls under a first subscription;
a memory module receiving device for removably receiving a memory module for storing second subscriber identity information for calls under a second subscription, whereas the first subscriber identity information is stored in the fixed memory independently of the memory module;
a selector for selecting between the information from the fixed memory and the memory module;
and an information processor adapted to use the information selected by the selector to provide ordinary operation of the telephone, selectively in either a first mode in accordance with the information stored in the fixed memory or in a second mode in accordance with the information stored in the memory module.

19. A telephone as claimed in claim 18 wherein ordinary operation of the telephone includes full outgoing call functionality.

20. A handset comprising:
a fixed memory for storing phone identity information for calls under a first subscription;
a memory module receiving a device for removably receiving a memory module for storing subscriber identity information for calls under a second subscription, the phone identity information in the fixed memory and the subscriber identity information in the memory module being stored independently of each other;
a selector for selecting between the information from the fixed memory and the memory module;
and an information processor adapted to use the information for operation of the handset under one or other of the subscriptions.

21. A telephone comprising:
a fixed memory for storing phone identity information for calls under a first subscription;
a memory module receiving device for removably receiving a memory module for storing subscriber identity information for calls under a second subscription;

a selector for selecting between the information from the fixed memory and the memory module, the selection of data being based on the location of the data being in the fixed memory or in the memory module;

and an information processor adapted to use the information selected by the selector for operation of the telephone under one or the other of the subscriptions.

22. A telephone as claimed in claim 21 wherein said phone identity information and said subscriber identity information form two sets of information stored separately.

23. A telephone comprising:

a fixed memory for storing number assignment module (NAM) data for calls under a first subscription;

a memory module receiving device for removably receiving a memory module for storing subscriber identity information for calls under a second subscription;

a selector for selecting between the information from the fixed memory and the memory module the selection of data being based on the location of the data being in the fixed memory or in the memory module;

and an information processor adapted to use the information selected by the selector for operation of the telephone under one or the other of the subscriptions.

24. A telephone as claimed in claim 23, wherein said information from s aid fixed memory and said subscriber identity information form two sets of information stored separately.

25. A telephone comprising:

a fixed memory for storing first subscriber identity information for calls under a first subscription;

a memory module receiving device for removably receiving a subscriber identity module (SIM) for storing second subscriber identity information for calls under a second subscription;

a selector for selecting between the information from the fixed memory and the SIM the selection of data being based on the location of the data being in the fixed memory or in the memory module;

and an information processor adapted to use the information selected by the selector for operation of the telephone under one or the other of the subscriptions.

26. A telephone as claimed in claim 25, wherein said first subscriber identity information and said second subscriber identity information form two sets of information stored separately.

27. A dual mode telephone comprising:

a fixed memory for storing first subscriber identity information for calls under a first subscription;

a memory module receiving device for removably receiving a memory module for storing second subscriber identity information for calls under a second subscription;

a selector for selecting between the information from the fixed memory and the memory module the selection of data being based on the location of the data being in the fixed memory or in the memory module;

and an information processor adapted to use the information selected by the selector to provide ordinary operation of the telephone, selectively in either a first mode in accordance with the information stored in the fixed memory or in a second mode in accordance with the information stored on the memory module.

28. A telephone as claimed in claim 26, wherein said first subscriber identity information and said second subscriber identity information from two sets of information stored separately.

29. A handset comprising:

a fixed memory for storing phone identity information for calls under a first subscription;

a memory module receiving device for removably receiving a memory module for storing subscriber identity information for calls under a second subscription;

a selector for selecting between the information from the fixed memory and the memory module the selection of data being based on the location of the data being in the fixed memory or in the memory module;

and a n information processor adapted to use the information for operation of the handset under one or other of the subscriptions.

30. A handset as claimed in claim 29, wherein said phone identity information and said subscriber identity information are being held separately.

* * * * *